United States Patent [19]

Ade et al.

[11] Patent Number: 4,484,094
[45] Date of Patent: Nov. 20, 1984

[54] ELECTRIC SMALL-SIZE MOTOR COMPRISING AN ARMATURE SECURED WITH PLASTIC MATERIAL

[75] Inventors: Rolf Ade; Heinz Heimann, both of Bietigheim-Bissingen; Wolfgang Kofink, Aichwald-Lobenrot; Hans Prohaska, Bietigheim-Bissingen, all of Fed. Rep. of Germany

[73] Assignee: ITT Industries, Inc., New York, N.Y.

[21] Appl. No.: 529,580

[22] Filed: Sep. 6, 1983

[30] Foreign Application Priority Data

Nov. 23, 1982 [DE] Fed. Rep. of Germany ....... 3243212

[51] Int. Cl.³ .............................................. H02K 1/04
[52] U.S. Cl. ................................. 310/43; 310/40 R; 310/216; 310/261
[58] Field of Search ................. 310/40, 42, 43, 261, 310/216, 40 MM, 269, 156

[56] References Cited

U.S. PATENT DOCUMENTS

| | | | |
|---|---|---|---|
| 2,488,729 | 11/1949 | Kooyman | 310/261 UX |
| 2,756,354 | 7/1956 | Baron | 310/261 X |
| 3,283,192 | 11/1966 | Somers et al. | 310/269 |
| 3,711,732 | 1/1973 | Gerber | 310/43 X |
| 4,074,157 | 2/1978 | Lace | 310/156 X |
| 4,120,618 | 10/1978 | Klaus | 310/156 X |
| 4,263,711 | 4/1981 | Sakano et al. | 310/43 X |

FOREIGN PATENT DOCUMENTS

| | | | |
|---|---|---|---|
| 3042527 | 6/1982 | Fed. Rep. of Germany | 310/43 |
| 1210349 | 3/1960 | France | 310/43 |

Primary Examiner—Mark O. Budd
Attorney, Agent, or Firm—James B. Raden; William J. Michals

[57] ABSTRACT

This invention relates to an electric small-size motor comprising an armature, whose shaft 31, whose laminated core 25 and whose commutator 26 are secured relative to one another in an integral plastics part 28, which also insulates the laminated core 25 from the windings. In order to couple the armature with a driven shaft a receiver 32 with a cross-section deviating from the shape of a circle is provided in the shaft 31 from at least one end of the latter, into which receiver the other shaft 33 with a matching cross-section can engage.

19 Claims, 19 Drawing Figures

ELECTRIC SMALL-SIZE MOTOR COMPRISING AN ARMATURE SECURED WITH PLASTIC MATERIAL

BACKGROUND OF THE INVENTION

This invention relates to an electric small-size motor which comprises the features of the preamble of claim 1.

A small-size motor of this kind is known from the German specification OS No. 28 38 405. In the armature of this motor the armature shaft, the laminated core and the commutator are mounted relative to one another in a plastics part made of one piece which also insulates the laminated core from the windings.

It is an object of this invention to develop an electric small-size motor comprising the features of the preamble of claim 1 so as to connect with the armature a second shaft in a simple way, which shaft moves in a rotary motion together with the armature.

SUMMARY OF THE INVENTION

This problem is solved according to the invention in that in an electric small-size motor comprising the features of the invention at least from one end of the armature shaft the latter is provided with a receiver, whose cross-section deviates from the shape of a circle, into which another shaft with a matching cross-section can engage. A form-fit connection between the armature shaft and the second shaft is created by the cross-sections deviating from the shape of a circle.

Advantageous embodiments of the invention can be seen from the subclaims. The armature of the electric small-size motor can be produced especially economically, when the major part of the armature part consists of the plastics material of the plastics part. It is advantageous to reinforce the shaft at least in the area of the receiver by an intermediate metal ply. The stability of shape of the receiver is in a particular way ensured if, according to the invention the intermediate metal ply, at least in sections, forms the side walls of the receiver.

The stability of the entire armature shaft can be increased in that the intermediate metal ply continues behind the end of the receiver in accordance with the invention. Moreover the intermediate metal ply is thereby better secured in the plastics material.

Another embodiment relates to an advantageous development of an electric small-size motor according to the invention. In this case, proceeding in the longitudinal direction of the armature shaft, the intermediate metal ply is a sheet metal folded like meanders, which sheet metal is provided with apertures at least in its portions standing substantially perpendicularly on the longitudinal direction of the receiver. Suitable designs of an electric small-size motor comprising an intermediate metal ply of this kind are included in the invention. By these designs it is achieved that the receiver is only subject to little wear and that the intermediate metal ply is well secured in the plastics material.

If a sheet metal folded to form meanders is used as an intermediate metal ply the reinforcement for the armature shaft differs very much in the various directions. If the reinforcement is to be made uniform a tube is advantageously used as an intermediate metal ply. According to the invention it is a tube whose circular inside diameter is greater than the circular outside diameter of the cross-section of the receiver. The receiver is reinforced thereby, however its side walls are entirely of plastic material. If the side walls are to be metallic, according to the invention a tube can be used whose inside cross-section equals the cross-section of the receiver and which forms the receiver. The intermediate metal ply can advantageously be also a round tube whose end is shaped so as to form in its interior a receiver with a cross-section which deviates from the shape of a circle. In this case the tubes advantageously extend over the entire length of the armature shaft.

It can be especially economical, if according to the invention the tube is formed of a planar sheet metal, in particular bent, rolled or wound. A design of this kind is of course also advantageous if the armature shaft does not have a receiver for a connection with a second shaft, because an armature shaft of this kind is reinforced by the tube in comparison with an embodiment in which it is completely made of plastics material. Compared with an embodiment having a solid steel shaft the embodiment with a tube made of sheet metal is cheaper.

If a tube is used as an intermediate metal ply in the armature shaft an especially close connection is achieved between the plastics part und the tube and an especially stable armature shaft in that the tube has apertures which, together with the interior of the tube, are filled with material of the plastics part.

Other embodiments relate to advantageous arrangements of these apertures on the tube. The apertures are thereby arranged in one or more rows. If the tube has a polygonal cross-section the rows of apertures are advantageously provided in corners of the tube. When the tube is formed from a planar sheet metal the bending lines are predetermined by the rows of apertures, so that it is especially easy to form the tube by bending.

A simplified design for coupling a second shaft onto the armature of an electric small-size motor according to the invention is achieved according to the invention in that a central passage of the laminated core forms the receiver with the cross-section deviating from the shape of a circle. Thus an additional intermediate metal ply in the plastics part is not needed. The laminated core which is in any case available is rather used as an intermediate metal ply.

For injection-moulding plastics material around the piece parts of the armature a design according to the invention is advantageous in particular. In this case the cross-section of the central aperture in the laminated core and the cross section of a metal shaft being part of the armature or of a metal tube being part of the armature are adapted to each other so as to provide that in circumferential direction contact points between laminated core and shaft or tube alternate with intermediate spaces in which the laminated core and the shaft or tube do not touch. Material of the plastics part is in the intermediate spaces. Due to a design of this kind it is possible to put the laminated core firmly onto the metal shaft or the metal tube already before the parts are inserted into the injection-moulding die. However during the process of injection-moulding around the piece parts the plastics material can flow from one side of the laminated core to the other in the intermediate spaces between laminated core and shaft or tube. This distance is shorter than the way around the laminated core, so that the plastics material beyond the the laminated core has hardly cooled down. Thus also long armatures can be injection-moulded in this manner. It can be easily seen that this design can also be advantageously used, if the armature shaft is not provided with a receiver for a connection with a second shaft.

The aperture in the laminated core advantageously has a polygonal cross-section. It is of advantage, when the shaft or the tube are round. If the polygon is a triangle the intermediate spaces between a shaft or a tube are particularly large, when this part is round.

According to another embodiment at least one end of the armature shaft is entirely made of plastics material and is supported there on an endshield by means of a pivot pin and a bore. In order to keep the relative velocity between the outer surface of the pivot pin and the jacket surface of the bore as low as possible the diameter of the pin and of the bore is clearly smaller than the portion of the shaft adjacent to these parts. There is little danger for the armature shaft to break, if according to the invention the endshield carries the pivot pin and the latter projects into a bore of the armature shaft. The pivot pin of the endshield is advantageously made of metal.

The bore in the armature shaft can be surrounded by a relatively thick plastics coating, so that a good stability is linked with a good support. The support is also improved in that according to the invention the pivot pin is slightly resilient, that at a spacing it is concentrically surrounded by a ring which is formed in one piece onto the plastics material of the armature shaft, and that the ring projects with play in the radial direction into a recess which is concentric to the bore for the pivot pin. The ring has the purpose of absorbing impacts and deflections due to extreme accelerations and thus to relieve the thinner pivot pin.

Another embodiment relates to the arrangement of an oil thrower ring on the armature shaft, and to a method of producing in a suitable manner this oil thrower ring.

The measures according to still other embodiments of course can also be advantageously used in an electric small-size motor, if its armature shaft does not have a receiver according to the invention.

This applies as well to the measure according to which the plastics part securing the laminated core and the commutator relative to each other is weakly conductive. Thus the commutator segments are embedded into a conductive plastics material. In parallel to the segments a current path is coming into existence via which the current peaks created upon commutation of the current from one segment to another can be reduced. The weak electric conductivity is advantageously achieved by adding graphite.

The specific resistance of the plastics member should lie between 10 and $10^3$ ohm-cm. Thus, dependent on the size of the injection-moulded commutator, the shunt resistance between two adjacent segments will amount to about 20 to 100 ohm. The insulation continues to be sufficient for the armature winding. Several embodiments of an electric small-size motor according to the invention are shown in the drawing.

BRIEF DESCRIPTION OF THE DRAWING

The invention will now be described in detail by way of the Figs. of this drawing, in which.

DETAILED DESCRIPTION

The various embodiments of an armature for an electric small-size motor shown in the Figs. of the drawing comprise a laminated core 25 and a commutator 26 with individual segments 27. A plastics part 28 secures the individual commutator segments 27 relative to one another and combines the entire commutator 26 and the laminated core 25 to a structural unit. There is not only material of the plastics part 28 within the ring formed by the commutator segments 27 and between the commutator 26 and the laminated core 25, but also on the front sides 29 and in the grooves 30 of the laminated core. Thus the plastics part 28 also insulates the laminated core 25 from the windings it carries. Each armature has a shaft 31 which is formed by the material around the centre line of the armature. The shaft 31 of each embodiment is at least from one end provided with a receiver 32 with a cross-section deviating from the shape of a circle. The cross-section of all embodiments is square, so that the receiver 32 can be designated square socket. Into this square socket can be pushed a shaft 33 whose four-edged end fits in the square socket 32 as a key in a key hole. If the armature rotates the shaft 33 is therefore rotated together with it. The shaft 33 is shown in the drawing only once in FIG. 1. Of course this shaft 33 can also be used in the other embodiments. Insofar as the armature shaft 31 is provided with two receivers of course two shafts 33 can be coupled to it.

Figure 1:
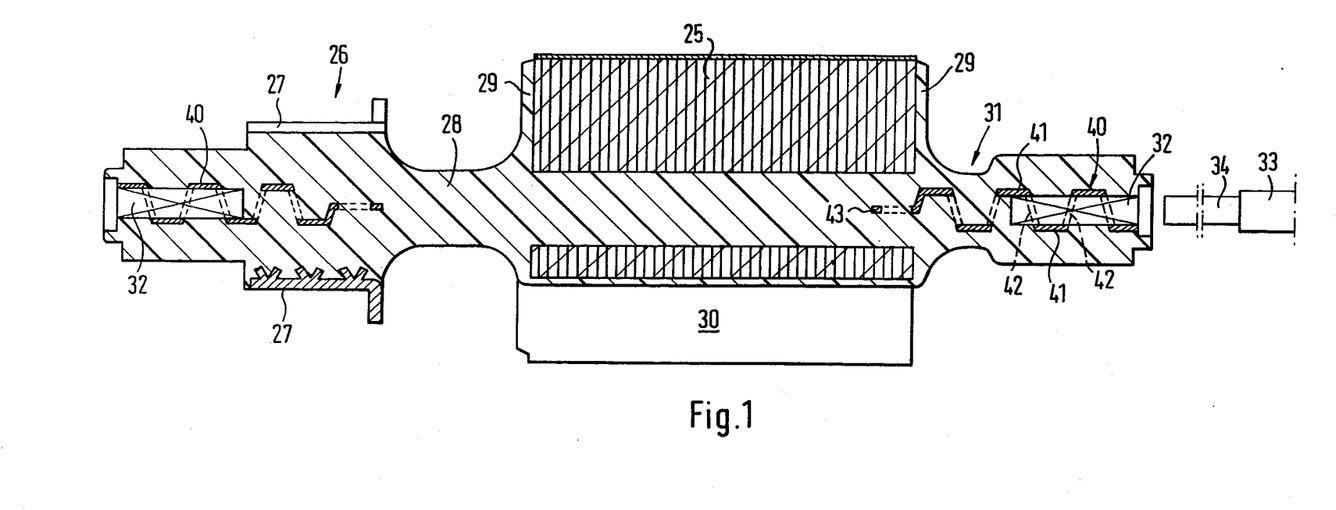
FIG. 1 is a longitudinal section through the armature of a first embodiment comprising two receivers for two further shafts, which receivers are reinforced by a folded sheet metal.
Figure 2:
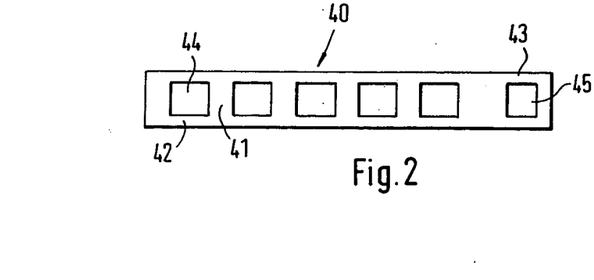
FIG. 2 is a top view on a sheet metal according to FIG. 1, which has just been punched out and is still in planar condition.

In the embodiment according to FIG. 1 a sheet metal 40 folded to form meanders is inserted in the plastics material in order to reinforce the armature shaft 33 and in particular the receiver 32. This sheet metal is composed of portions 41 which are arranged in parallel on two opposite sides of the square socket 32 alternately on one or the other of the two side walls mentioned, the portions 42 which extend approximately perpendicularly to the portions 41 and combine them, and a portion 43. Apertures 44 are punched out of the portions 42. The rim of these apertures is flush with the side walls of the square socket. Because the portions 42 are slightly inclined, the apertures 44 are not square, but rectangular. This can especially clearly be seen in FIG. 2 which shows the sheet metal still in the planar and punched-out condition. Behind the square socket 32 the sheet metal 40 continues in meanders with portions 41 and portions 42 with apertures 44 and ends in the portion 43 which occupies a central height between the portions 41 and has an aperture 45. This results in a particularly good anchorage of the sheet metal 40 in the plastics material. The square socket 32 has a good dimensional stability because its side walls are partly formed by the sheet metal 40. In the embodiment according to FIG. 1 the shaft 31 is provided on both ends with a square socket 32 and a sheet metal 40. The two sheet metals are exactly alike. They are however inserted in the plastics material turned by 180 degrees around the axis of the armature, so that the first portion 41 is flush with one side wall of one square socket and the other with the opposite side wall of the other square socket.

Figure 3:
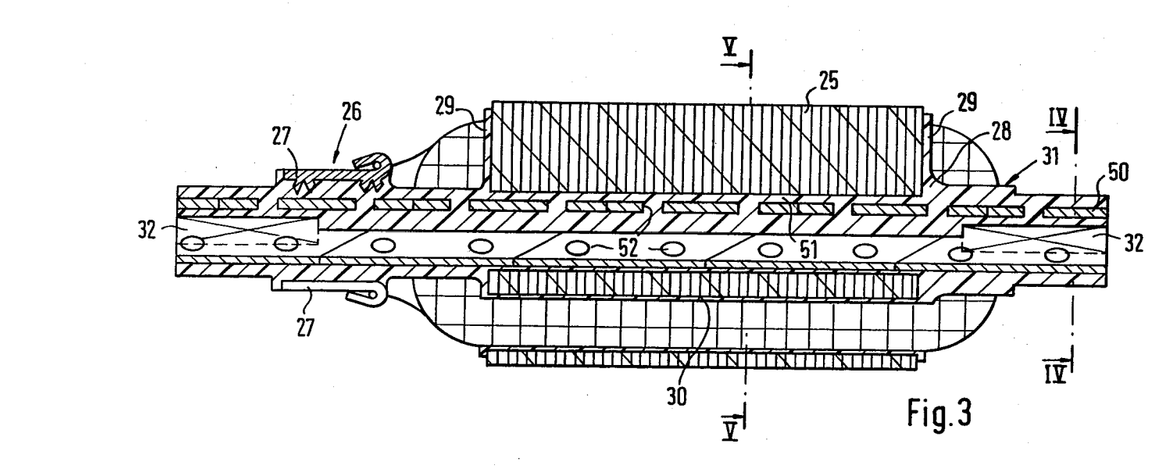
FIG. 3 is a longitudinal section taken on the line III—III of FIG. 5 through a second armature comprising a shaft which is reinforced by a wound tube.
Figure 4:
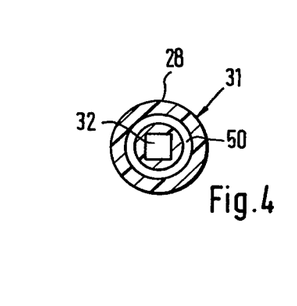
FIG. 4 is a section taken on the line IV—IV of FIG. 3.
Figure 5:
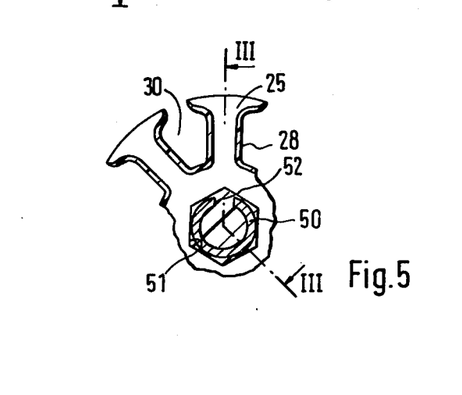
FIG. 5 is a partial section taken on the line V—V of FIG. 3.

In the embodiment according to FIGS. 3 to 5 a tube 50, which goes through one end to the other end of the armature shaft 31 is part of it, thus also extends through the central opening 51 in the laminated core 25. The tube 50 is wound of a narrow sheet metal strip. From this sheet metal strip are punched out holes 52 in a position relative to each other as to provide that, after the tube has been wound, the holes are arranged in the longitudinal direction of the armature one behind the other in two rows diametrically opposed to each other. Moreover the holes are not arranged exactly opposite to each other, they are rather staggered relative to each other in the longitudinal direction of the armature. The outside diameter of the tube 50 is smaller than the inside diameter of the six-edged opening 51 in the laminated core 25, so that there is plastics material everywhere between the laminated core 25 and the tube 50.

The receivers 32 are within the tube 50, and the spacing between two opposite corners of the receivers 32 is indeed smaller than the inside diameter of the tube 50. When the piece-parts of the armature are injection-moulded around with plastics material thus it can flow into the tube interior along the tool portion forming the receiver 32. Plastics material also flows into the interior of the tube 50 through the holes 52. In order to make possible that this can be done particularly well, the two rows of holes are positioned in two corners of the opening 51 as can be seen from FIG. 5.

Thus the tube 50 is entirely embedded in plastics material. The material inside and outside of the tube is connected. In this way the individual parts are firmly secured to one another.

In FIG. 3 the plastics material in one half of the interior of the tube 50 is not shown in the drawings, so that one row of holes can be clearly seen.

Figure 6:
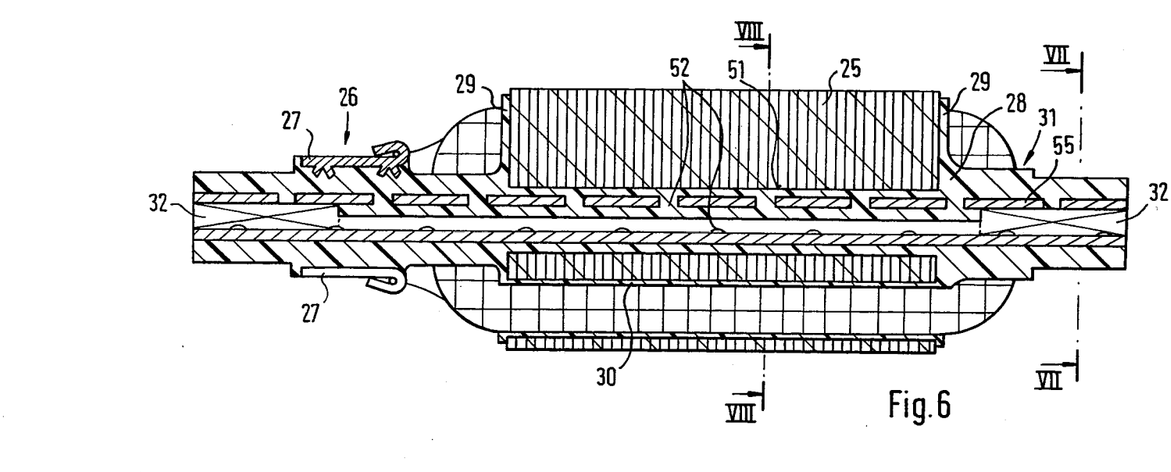
FIG. 6 is a longitudinal section taken on the line VI—VI of FIG. 7 through a third armature comprising a shaft, which is reinforced by a tube bent from a planar sheet metal.
Figure 7:
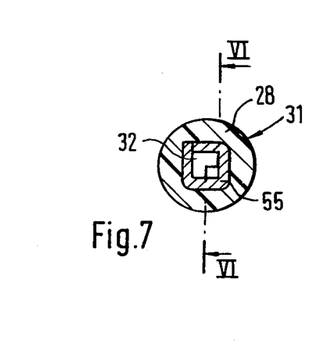
FIG. 7 is a section taken on the line VII—VII of FIG. 6.
Figure 8:
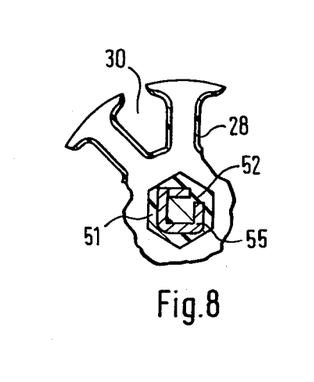
FIG. 8 is a partial section taken on the line VIII—VIII of FIG. 6.

FIGS. 6 to 8 show an embodiment in which, instead of a round tube according to FIG. 3, a tube is used which has a square outside and inside cross-section. This tube 55 is bent out of a planar sheet metal. The inside cross-section corresponds to the cross-section of the receiver 32, whose side walls are thus formed by the tube 55. In each of the three corners without a joint the tube 55 has a row of holes 52 which again can be staggered relative to one another from row to row in the longitudinal direction of the shaft 31. Of course a row of holes can also be provided in the corner of the joint. The rows of holes form predetermined bending lines, so that the tube 55 can be easily brought into its square shape. Moreover plastics material flows into the interior of the tube 55 through the holes 52, when the piece-parts of the armature are injection-moulded around. In one half of the tube interior the plastics material has again been omitted in FIG. 6, so that one row of holes can be seen. Because furthermore there is a spacing everywhere between the tube 55 and the laminated core 25, the tube, apart from the receivers 32, is entirely surrounded by plastics material. It is therefore very well secured in the plastics material.

Similar as in the example of FIG. 3 in the embodiment according to FIGS. 9 to 11 again a tube is used which is round inside and outside. However this tube 56 is entirely jointless. It projects with two end portions 57 over the plastics part 28. These end portions are deformed in a way to provide that they are still round outside and can serve as pivot pins, while they form a four-edged receiver 32 inside.

Figure 9:
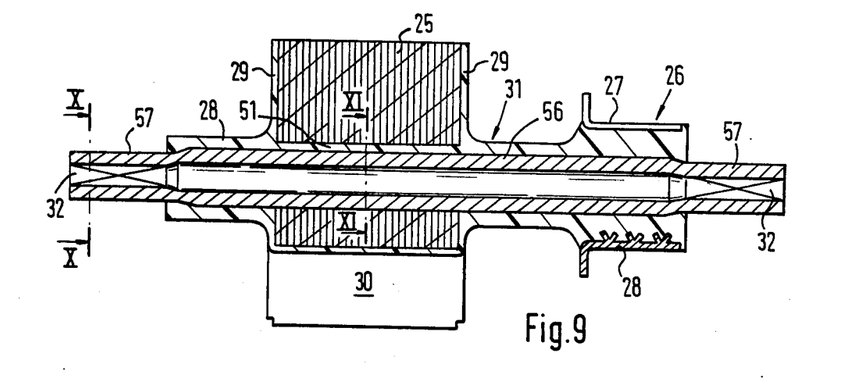
FIG. 9 is a longitudinal section through a fourth armature comprising an armature shaft with a tube whose ends are formed as receivers for further shafts.
Figure 10:
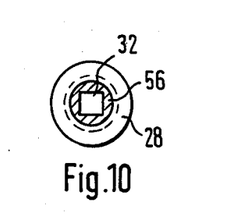
FIG. 10 is a section taken on the line X—X of FIG. 9.
Figure 11:
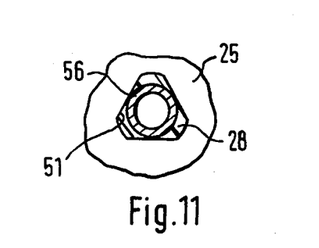
FIG. 11 is a partial section taken on the line XI—XI of FIG. 9.

The central opening 51 of the laminated core 25 has a substantially triangular, thus a polygonal cross-section. Only the corners of this triangle are rounded. The inside diameter of the opening 51 is slightly smaller than the outside diameter of the tube 56. The laminated core 25 can thereby be pushed on the tube 56 with snug fit. On the other hand in the corners of the opening 51 there are still so large spacings between the tube 56 and the laminated core 25, that plastics material can flow through them from one side of the laminated core to the other. Thus the design described combines the possibility of a firm connection between tube 56 and laminated core 25 with an appropriate flowing course of the plastics material, because the way through the central opening 51 is shorter than that through the grooves 30 of the laminated core 25. Of course these advantages are also given, when the tube 56 is substituted by a solid shaft.

Figure 12:
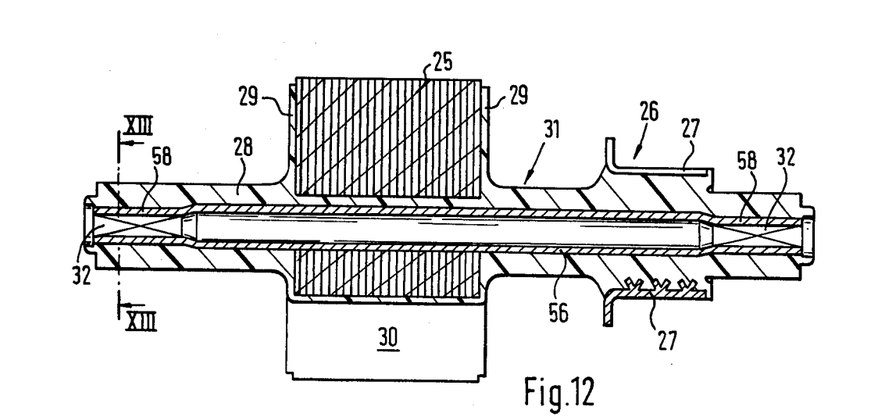
FIG. 12 is a longitudinal section through an armature similar to that of FIG. 9, in which armature the ends of the tube are coated with plastics material by injection-moulding.
Figure 13:
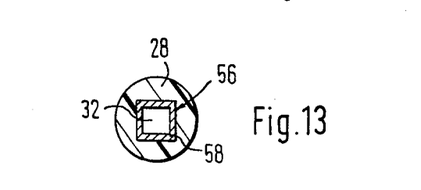
FIG. 13 is a section taken on the line XIII—XIII of FIG. 12.

In the embodiment according to FIGS. 12 and 13 again a tube 56 is used which, apart from the end portions 58, is round inside and outside. However in this case the end portions 58 are not only square inside to form a receiver 32, but have also a square cross-section outside. They are covered by the plastics part 28, which is round outside, so that a round pivot pin has been created.

Figure 14:
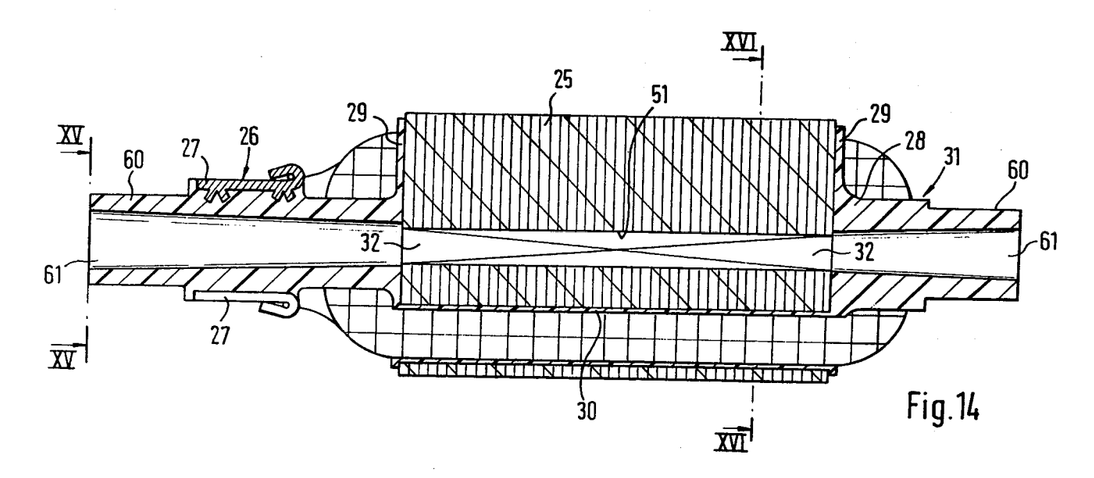
FIG. 14 is a longitudinal section taken on the line XIV—XIV of FIG. 15 through a sixth armature, wherein the receivers for coupling further shafts are formed by the central aperture in the laminated core.
Figure 15:
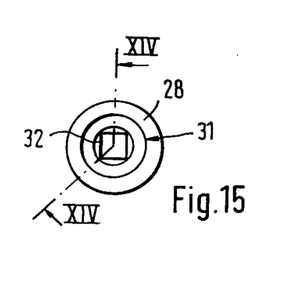
FIG. 15 is a section taken on the line XV—XV of FIG. 14.
Figure 16:
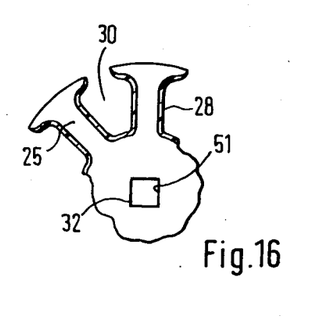
FIG. 16 is a partial section taken on the line XVI—XVI of FIG. 14.

In the embodiment according to FIGS. 14 to 16 the central opening 51 of the laminated core 25 has a square cross-section. It forms the two receivers 32 for coupling two other shafts. In each of the two ends 60 of the shaft 31 a hollow space 61 is provided, which ends are adjacent to the front sides 29 of the laminated core 25. The hollow space 61 extends from the respective end of the shaft as far as to the laminated core 25 and the shafts to be coupled are guided through it. Starting from the laminated core the hollow spaces 61 widen towards the ends of the shaft 31 in the way of a truncated cone. However cylindrical hollow spaces 61 or hollow spaces 61 with a polygonal cross-section are also possible. The shaft ends 60, which are part of the plastics member 28, are connected by material in the grooves of the laminated core 25.

Figure 17:
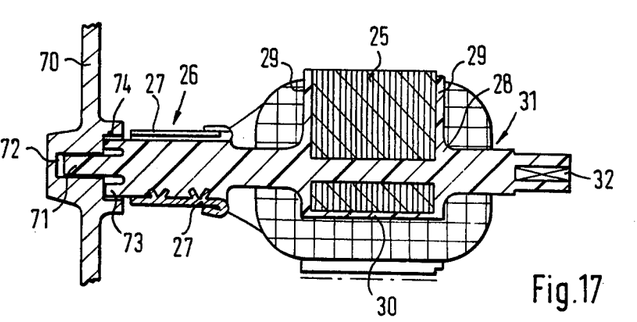
FIG. 17 is a longitudinal section through a seventh armature comprising a pivot pin and an additional bearing ring.
Figure 18:
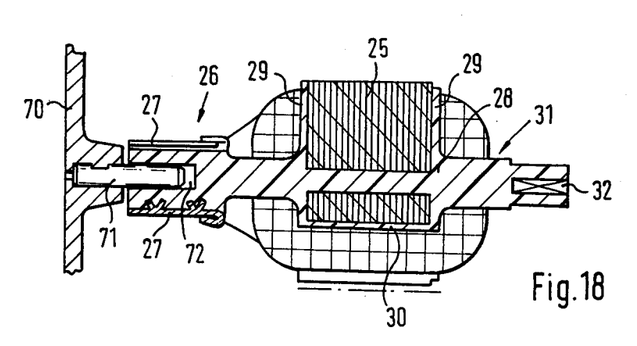
FIG. 18 is a longitudinal section through an eighth armature comprising a bore within the commutator and FIG. 19 is a longitudinal section through a ninth armature comprising an oil thrower ring.
Figure 19:
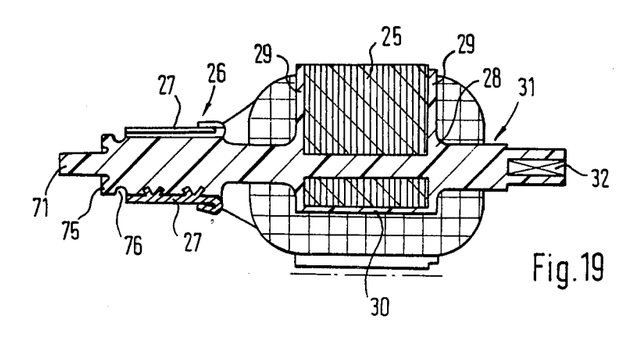

Just as in the embodiment according to FIGS. 14 to 16 in the embodiments according to FIGS. 17 to 19 it has also been done without an additional intermediate metal ply in the armature shaft. On one end of the shaft 31 there is the four-edged receiver 32 positioned in the shaft, via which receiver the armature can be coupled with a further shaft. FIGS. 17 to 19 do not show in detail how the armature is mounted on the shaft end accomodating the receiver 32. For the support on the other end of the shaft 31 three possibilities are shown in FIGS. 17 to 19 which, as a matter of fact, have also advantages, if the shaft does not comprise a receiver 32.

For a support on an endshield 70 serve a pivot pin 71 and a bore 72 whose diameter is clearly smaller than the portion of the shaft 31 adjacent to these parts. In the embodiments shown the adjacent portion is the commutator 26. Thus the relative velocity between pivot pin and bore is relatively low because of the small diameter, so that the heat generated by the friction does not reach a value which would damage the bearing.

In the embodiment according to FIG. 17 the pivot pin 71 is provided on the shaft 31 and lies in the bore 72 of the endshield 70. The pivot pin 71 is surrounded by a ring 73 at a spacing, which ring is also integral with the plastics part 28, is shorter than the pin 71 in the axial direction and projects into a bore 74 with greater diameter, which bore is concentric to the bore 72. The diameter of the bore 74 is slightly greater than the outside diamter of the ring 73, so that in the radial direction there is a play between ring 73 and bore 74. The diameters differ approximately 0.2 to 0.4 mm. During normal operation the bearing function is entirely taken over by the pivot pin 71 and the assigned bore 72. Impacts and deflections through extreme acceleration are absorbed by the ring 73, so that the pivot pin 71 is not loaded too heavily. The length of the bores 72 and 74 as well as the dimensions of the pivot pin 71 and of the ring 73 in the axial direction are adapted to one another in a way that an axial force is transmitted from the front side of the ring 73 to the endshield 70. By the double support in the embodiment according to FIG. 17 the advantages of a pivot pin with a small diameter and a pivot pin with a large diameter are excellentely combined.

In the embodiment of FIG. 18 the bore 72 is positioned within the commutator segments 27 in the shaft 31. The pivot pin 72 projects into it, which pivot pin is sealed in the endshield 70 and held to be protected against twisting. The pin 71 consists of metal. The bore 72 is surrounded by a lot of plastics material, so that a very stable support is achieved.

In the embodiment of FIG. 19 a pivot pin 71 is again integrally injection-moulded on the shaft 31. Between the pivot pin 71 and the commutator is inserted an additional oil thrower ring 75, which is also an integral part of the plastics member 28. During the production a collar is formed on in front of the commutator 26, which collar has the same diameter everywhere. Thereafter the ring-shaped recess 76 is milled by means of a form tool. This recess essentially contritubes to prevent that oil advances to the commutator 26.

In all electric small-size motors according to the invention the commutator segments 27 are embedded in the plastics part 28. The plastics material is now made conductive, so that a current path comes into existence in parallel to the commutator segments 27, via which the voltage peaks can be reduced which are produced when the current is commutated from one segment to the other. The conductivity of the plastics material can for example be achieved by an ad-mixture of graphite. The specific resistance of the plastics material should approximately amount to 10 to $10^3$ ohm-cm. Thus the shunt resistance between two adjacent segments 27 will amount to 20 to 100 ohm in dependence on the size of the injection-moulded commutator 26. The insulation continues to be sufficient for the armature winding, because the plastics material has a relatively high specific resistance. Thus the electric-motor becomes interference-free in a very simple manner.

What is claimed is:

1. An electric small-size motor comprising an armature, whose shaft (31), laminated core (25) and conmutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another shaft (33) with a matching cross-section can engage;

wherein the major part of the armature shaft (31) consists of plastics material being part of the plastics part (28) and is reinforced by an intermediate metal ply (25, 40, 50, 55, 56); and     wherein in the longitudinal direction of the armature shaft (31) the intermediate metal ply is a sheet metal (40) folded like meanders, which sheet metal is provided with apertures (44) at least in its portions (32) standing substantially perpendicularly on the longitudinal direction of the receiver (32).

2. An electric small-size motor according to claim 1, characterised in that the apertures (44) are shaped in a way that their rim is flush with the side walls of the receiver (32).

3. An electric small-size motor according to claim 2, characterised in that the portions (41) between the apertures (44) are flush with the side walls of the receiver (32).

4. An electric small-size motor comprising an armature, whose shaft (31), laminated core (25) and commutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another shaft (33) with a matching cross-section can engage;

wherein the major part of the armature shaft (31) consists of plastics material being part of the plastics part (28) and is reinforced by an intermediate metal ply (25, 40, 50, 55, 56); and     wherein the intermediate metal ply is a tube (50) whose circular inside diameter is greater than the circular outside diameter of the cross-section of the receiver (32).

5. An electric small-size motor comprising an armature, whose shaft (31), laminated core (25) and commutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another shaft (33) with a matching cross-section can engage;

wherein the major part of the armature shaft (31) consists of plastics material being part of the plastics part (28) and is reinforced by an intermediate metal ply (25, 40, 50, 55, 56); and wherein the intermediate metal ply is a tube (55) whose inside cross-section equals the cross-section of the receiver (32) and which forms the receiver (32).

6. An electric small-size motor comprising an armature, whose shaft (31), laminated core (25) and commutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another shaft (33) with a matching cross-section can engage;

wherein the major part of the armature shaft (31) consists of plastics material being part of the plastics part (28) and is reinforced by an intermediate metal ply (25, 40, 50, 55, 56); and wherein the intermediate metal ply is a round tube (56) which on one end is deformed so as to form in its interior a receiver (32), which has a cross-section deviating from the shape of a circle.

7. An electric-small-size motor according to claim 6, characterised in that the deformed portion (57) of the tube (56) is circular outside.

8. An electric small-size motor according to claim 6, characterised in that the deformed portion (58) of the tube (56) is embedded with plastics material by injection-moulding.

9. An electric small-size motor comprising an armature, whose shaft (31), laminated core (25) and commutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another shaft (33) with a matching cross-section can engage;

wherein the major part of the armature shaft (31) consists of plastics material being part of the plastics part (28) and is reinforced by an intermediate metal ply (25, 40, 50, 55, 56); and wherein the intermediate metal ply is a tube (50,55) which has apertures (52) which, together with the interior of the tube (50,55) are filled with material of the plastics part (28).

10. An electric small-size motor according to claim 9, characterised in that the apertures (52) are arranged in one or more rows in the longitudinal direction of the tube (50,55).

11. An electric small-size motor according to claim 10, characterised in that the tube (55) has a polygonal cross-section and the rows of apertures (52) are in the corners of the tube (55).

12. An electric small-size motor comprising an armature, whose shaft (31), laminated core (25) and commutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another shaft (33) with a matching cross-section can engage;

wherein the major part of the armature shaft (31) consists of plastics material being part of the plastics part (28) and is reinforced by an intermediate metal ply (25, 40, 50, 55, 56); and wherein the intermediate metal ply is a tube (50,55) which is formed of a planar sheet metal, especially bent, rolled or wound; and wherein the aperture (51) in the laminated core (25) has a polygonal and preferably an equilateral cross-section.

13. An electric small-size motor according to claim 12, characterised in that the corner of the aperture (51) are rounded.

14. An electric small-size motor according to claim 12 or 19, characterised in that the polygon is a triangle.

15. An electric small-size motor comprising an armature, whose shaft (31), laminated core (25) and commutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another shaft (33) with a matching cross-section can engage;

wherein the armature shaft (31) consists entirely of plastics material at least on one end and is mounted there by means of a pivot pin (71) and a bore (72) on an endshield (70) and that the diameter of the pin (71) and the bore (72) is clearly smaller than the portion (26) of the shaft (31) adjacent to these parts.

16. An electric small-size motor according to claim 15, characterised in that the pivot pin (71) is also injection-moulded onto the armature shaft (31) and projects into a bore (72) of the endshield (70).

17. An electric small-size motor according to claim 15, characterised in that the endshield (70) carries the pivot pin (71) and that the latter projects into a bore (72) of the armature shaft (31).

18. An electric small-size motor according to claim 15, characterised in that the pivot pin (71) is slightly resilient, that at a spacing it is concentrically surrounded by a ring (73) which is formed in one piece onto the plastics material of the armature shaft (31), and that the ring (73) projects with play in the radial direction into a recess (74), which is concentric to the bore (72) for the pivot pin (71).

19. A method for making an electric small-size motor comprising an armature, whose shaft (31), laminated core (25) and conmutator (26) are secured relative to one another in an integral plastics part (28) which also insulates the laminated core (25) from the windings, characterised in that at least from one end of the shaft (31) the latter is provided with a receiver (32) whose cross-section deviates from the shape of a circle, into which another part (33) with a matching cross-section can engage the armature shaft (31) consists entirely of plastics material at least on one end and is mounted there by means of a pivot pin (71) and a bore (72) on an endshield (70) and that the diameter of the pin (71) and the bore (72) is clearly smaller than the portion (26) of the shaft (31) adjacent to these parts, with an oil thrower ring (75) integrally formed onto the armature shafting characterised in that in front of the commutator (26) is injection-moulded a collar which has the same diameter everywhere and that at the end of the collar and adjacent to the commutator (26) a ring-shaped recess (76) is made by a form tool.

* * * * *